United States Patent Office 3,116,450
Patented Dec. 31, 1963

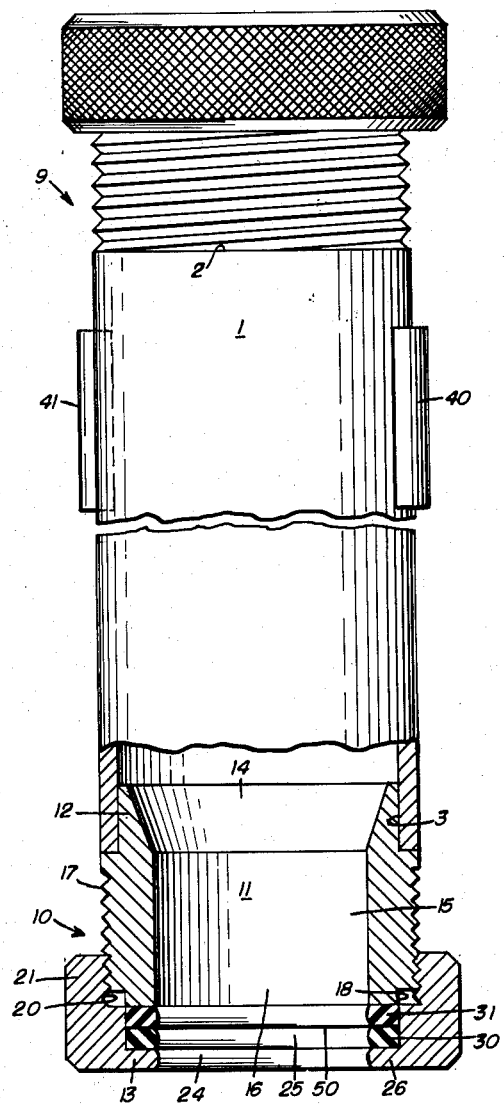

3,116,450
TRACER LIQUID RELEASE TUBE HAVING FRANGIBLE ELEMENTS AT OPPOSITE ENDS OF THE TUBE
Stanley M. Longwill, Doylestown, Pa., assignor to the United States of America as represented by the Secretary of the Interior
Filed Aug. 25, 1961, Ser. No. 134,057
5 Claims. (Cl. 324—2)
(Granted under Title 35, U.S. Code (1952), sec. 266)

The invention herein described and claimed may be manufactured and used by or for the Government of the United States of America for governmental purposes without the payment of royalties thereon or therefor.

The invention concerns a device for selectively placing a tracer liquid in water of a well borehole, and having particular utility in conjunction with the operation of an electric well logging apparatus. In operating the logging apparatus, a fluid conductivity probe thereof functions in the borehole wherein the invention releases the tracer liquid such that the probe is effective to detect changes in the concentration of released liquid. Responsive to the resulting output of the probe, the logging apparatus provides data for a determination of the direction and velocity of the water flow in the borehole.

In the past, measurements of the water flow in well boreholes were made by using vane-type subsurface flowmeters, similar to that described in U.S. Patent No. 2,713,261, to Butterworth et al., issued July 19, 1955. However, the use of such mechanically operated instruments has been discouraged by their characteristic sluggish performance at low velocities, and the difficulty in centering them in the bore hole. Water flow measuring arrangements utilizing electrical conductivity probes, and with which the tracer liquid release device of the present invention is applicable to cooperate, do not have these drawbacks. Typical structural details of probes and tracer liquid release devices for such arrangements are found disclosed in U.S. Patent No. 2,724,267 to Bond et al., issued on November 22, 1955, and U.S. Patent No. 2,739,476, to Atkins, issued March 27, 1956. Although there are many forms of fluid conductivity probes used in electrical well logging operations, the present invention is particularly suited to function in connection with those comprising fluid resistivity electrodes. Well logging apparatus comprising probes of this nature is fully described in U.S. Patent No. 2,172,625, to Schlumberger, issued September 12, 1939.

A general objective of well logging operations in water wells is the accumulation of geologic and hydrologic data for developing new or improved approaches to certain hydrologic problems. One such problem is that of properly logging a multiaquifer well yielding water from two or more aquifers or porous rock strata carrying water. Data gathering by this logging may be interpreted to determine the discharge-drawdown relations of the individual aquifers supplying the well. A detailed discussion of the practical and theoretical aspects of this problem may be found in the Geological Survey Water-Supply paper 1536-A, Borehole Geophysical Methods for Analyzing Specific Capacity of Multiaquifer Wells, by Gordon D. Bennett and Eugene P. Patten, Jr., published by the U.S. Government Printing Office, Washington, D.C. (1960).

In applying the present invention to the aforementioned problem of determining the direction of water flow between two aquifers at two distinct elevations wherein the borehole, the tracer liquid is released midway between the aquifers, and its flow path or movement through the borehole is traced with the fluid-resistivity probe. In an exemplary trial run, a "slug" of tracer fluid after release, was found to essentially maintain its shape and concentration until it was opposite the lower aquifer where the concentration of the slug diminished rapidly indicating a flow from the aquifer of higher elevation to that of a lower elevation. Having thus established the direction of flow, a test for the flow velocity between aquifers is made possible by again releasing a slug of tracer liquid immediately below the higher aquifer, and lowering the fluid resistivity probe through the slug. A stop watch is started when a logging recording device indicates that the probe has passed through the point of maximum concentration of the tracer liquid. Thereafter the probe is positioned just above the lower aquifer and held stationary until the leading edge of the slug causes a deflection of the recorder. The probe is then raised in the borehole and the watch stopped when the point of maximum concentration is recorded on the logging recorder. Allowing the tracer liquid to travel the longest practical distance between the two aquifers minimizes velocity errors due to constrictions of the borehole. Flow velocity is computed from the distance the tracer liquid peak concentration traveled as indicated on the logging recorder chart, and the time taken for it to migrate from peak to peak as indicated by the difference in stop watch readings.

An object of the present invention is to provide a means for releasing a quantity of tracer liquid at a predetermined location in a well borehole, in a convenient and positive manner.

Another object of the present invention is to provide an enclosure means having special frangible sealing elements by means of which a quantity of tracer liquid may be selectively placed at a location within flowing water of a well borehole.

A still further object of the invention is to provide a tubular enclosure for storing a tracer liquid between specially prepared seals on the respective ends thereof, and operative when suspended in a liquid at a location in a well borehole, to be unsealed for releasing the tracer liquid.

These and other objects and advantages of the invention will be more clearly understood from the following description of a preferred embodiment of the invention, considered together with the accompanying drawing. The FIGURE of the drawing shows a fragmentary side elevation of a release tube embodying the invention, a portion of which is partly broken away to more clearly illustrate the invention by a sectional view of an important feature.

The device constituting the preferred form of the invention, is essentially a pipe-like enclosure having a length about six times its diameter. An elongated thin-walled tubular element 1 of brass or other similar corrosion resistant metal, makes up most of this length. At the opposite ends of the tubing 1, there are openings 2 and 3 which receive within them the respective connective portions of plug assemblies 9 and 10. Since these assemblies are identical in their structural form, a description thereof is made only with reference to plug assembly 10. An adapter member 11 also of brass, and a cap assembly 13, secured thereto, having means for retaining a sealing element within it, make up the plug assembly 10.

At one end of the cylindrical member comprising adapter 11, is an annular collar-like rim 12, which provides the aforesaid connective portion coacting with the tubular element 1. The diameter of rim 12 is appropriately reduced to allow this rim to be press fitted and soldered within the opening 3 of the tubular element. Formed within the opening through rim 12 at one end of the adapter is a funnel shaped hole 14, converging inwardly to join a passage 15 of uniform diameter opening through the opposite end 16 of the adapter. The outer surface of the adapter which extends from rim 12, conforms to the cylindrical shape of tubular element 1. Cut into this surface of the adapter, is a coarse screw thread 17. Ending the screw thread 17, is a short machined down rim 18, forming around opening 16, an annular seat on the end face of the adapter 11.

Cap member 13 has a screw thread 20 cut into an inner wall of a rim 21 defining a wide opening in one end thereof, which is provided for accommodating the adapter, and effecting a threaded engagement with the screw thread 17 on its outer surface. Like the parts cooperating with the cap member, it may be made of brass, and around the surface of its rim 21, a knurling pattern is cut into the brass by conventional means. In the opposite end, or outer face of the cap 13, an opening 24 having a diameter corresponding closely to that of the adapter passage 15 leads back into a wider medial opening 25 having a diameter matching that of the annular seat formed by rim 18. The uninterrupted path through the three openings of the cap 13, connects with passage 15 of the adapter to provide a conduit to the outside, from the inside the tubular element 1.

To facilitate the retention of two special sealing elements 50, hereinafter to be described, there are cemented to the inside of a flange 26 formed between openings 24 and 25, and to the seat formed by rim 18, individual rubber gaskets 30 and 31, respectively. Sealing elements 50 are gelatin disks cut from sheet gelatin approximately 0.01 inch thick, to a diameter such that they would close over and seal the opening 25. Plug assembly 10 is completed by inserting the gelatin disks to rest on the gasket 30, and by then carefully engaging the cap 13 to the threads 17 of the adapter 11, to permit the cap to be screwed on to effectuate a water-tight seal between rubber gaskets 30 and 31.

In addition to the identical plug assemblies 9 and 10 fitted to its opposite ends, the tubular element 1 is equipped with rope retainer tubes 40, 41, which are soldered along opposite side of the tubular element. Threaded through the retainer tubes are lengths of nylon rope which have secured thereto, heavy duty snap hooks. To prevent the ropes from slipping out of the retainer tubes, the rope ends are heated to form a solid ball of nylon material that cannot be drawn through the tubes.

A tracer liquid such as brine, is found highly satisfactory for water well logging operations, and is used in the device of the preferred embodiment. However, any aqueous solution of water-soluble inorganic salt, or small amounts of aqueous solutions of organic or inorganic acids may be similarly employed. After the cap 13 of one of the plug assemblies is secured to tighten its gelatin seals 50, brine is loaded into the tubular element 1 through the adapter passage in the plug assembly of the opposite end, and the cap thereof is subsequently screwed on to tighten in place its gelatin seals. When pouring the salt solution it is important to completely fill the tube in order to prevent premature rupture of the gelatin disks by the fluid pressure in the borehole.

Attached by means of the snap hooks on the support harness to the lower section of the fluid conductivity probe of an electric well logger, the tube maintained in vertical position is carefully lowered in a well to any desired depth below the water level. After an elapsed time of approximately five minutes the probe and tube are suddenly lowered an additional ten feet. This movement produces sufficient force to rupture the softened gelatin disks and expel the contents of the tube in the borehole fluid. If the water in the borehole where the brine slug was released is moving, the brine will be carried in the same direction and at the same velocity as the borehole fluid. As previously noted, this movement can be easily followed by tracing with the fluid conductivity probe of the electric logger.

While a preferred embodiment of the invention has been illustrated and described herein, it is to be understood that the invention is not limited thereby, but is susceptible of changes in form and detail.

I claim:

1. A sealed device containing and storing a liquid and supported for suspension in water wherein it is made operable by a rapid vertical movement thereof through the water to rupture its seal and release into the water its stored liquid contents, said device comprising an enclosure having a hollow, elongated intermediate element provided with like openings at opposite ends thereof, separate plugging means, each plugging means comprising an extension at one end thereof, said respective extensions being secured within the like openings at the opposite ends of the said intermediate element, individual frangible means, means within each plugging means tightly gripping separate ones of said frangible means whereby said like opening corresponding to each said plugging means is closed and the said contents stored in the device is sealed therein, and means fixed to said intermediate element wherefrom the device is suspended.

2. The device of claim 1, wherein the frangible sealing means includes gelatin disks.

3. A sealed enclosure device having stored therein a distinguishing liquid, said enclosure being supported for suspension in a further liquid and made operable by a sudden vertical movement thereof in said further liquid to rupture its seal, whereby said distinguishing liquid stored therein is released therefrom, said enclosure comprising an elongated intermediate tubular element provided with like openings at opposite ends thereof, separate plugging assemblies each comprising a cylindrical extension at one end and a closure cap on the end opposite thereto, said respective cylindrical extensions being received and secured within the like openings at the opposite ends of the intermediate tubular element, each said closure cap having an opening therethrough completing a passage into said intermediate tubular element, separate gripping means in said cap opening and individual frangible elements secured within said each said cap opening by said gripping means so as to fill the said cap openings and seal said distinguishing fluid within said enclosure, and means fixed to said enclosure wherefrom it is suspended.

4. In the device of claim 3, the individual frangible elements each comprising a gelatin disk.

5. The device of claim 3, wherein said separate gripping means in each said cap opening comprises two rubber gaskets which secure between them said individual frangible elements.

References Cited in the file of this patent

UNITED STATES PATENTS

| | | |
|---|---|---|
| 244,042 | Farrar | July 12, 1881 |
| 1,725,979 | Ennis | Aug. 27, 1929 |
| 2,586,285 | Ackermann | Feb. 19, 1952 |
| 2,661,121 | Coffman et al. | Dec. 1, 1953 |
| 2,756,828 | Deily | July 31, 1956 |
| 3,071,281 | Sawai | Jan. 1, 1963 |